United States Patent

Yajima et al.

[11] Patent Number: 5,349,322
[45] Date of Patent: Sep. 20, 1994

[54] RESISTORS FOR THERMAL FLOWMETERS

[75] Inventors: Yasuhito Yajima; Fujio Ishiguro; Horoshi Nakajima, all of Nagoya, Japan

[73] Assignee: NGK Insulators, Ltd., Japan

[21] Appl. No.: 25,426

[22] Filed: Mar. 1, 1993

[30] Foreign Application Priority Data

Mar. 27, 1992 [JP] Japan .................. 4-071249
Feb. 2, 1993 [JP] Japan .................. 5-015145

[51] Int. Cl.$^5$ ............................. H01C 3/04
[52] U.S. Cl. ...................... 338/25; 338/270; 338/273
[58] Field of Search ............... 338/25, 270, 273, 274, 338/271, 275, 276, 89, 22 R; 204/192.1

[56] References Cited

U.S. PATENT DOCUMENTS

| | | | |
|---|---|---|---|
| 4,542,650 | 9/1985 | Renken et al. | 338/319 X |
| 4,903,001 | 2/1990 | Kikuchi | 338/22 R |
| 5,144,279 | 9/1992 | Yajima et al. | 338/270 |
| 5,175,527 | 12/1992 | Ishiguro et al. | 338/25 |

FOREIGN PATENT DOCUMENTS 61-40513  2/1986  Japan .

*Primary Examiner*—Marvin M. Lateef
*Attorney, Agent, or Firm*—Parkhurst, Wendel & Rossi

[57] ABSTRACT

A resistor for a thermal type of flowmeter includes a ceramic substrate, a thin platinum film formed on the surface of the ceramic substrate, and lead wires for connecting the thin platinum film with an external circuit, and is located in a fluid to detect its flow rate. When the resistance value, R ($\Omega$), of the resistor for a thermal type of flowmeter is expressed in terms of a function of temperature, T (°C.):

$$R = R_0 (1 + \alpha T + \beta T^2)$$

where $R_0$ is the resistance value in $\Omega$ of the resistor for a thermal type of flowmeter at 0° C., $\alpha$ is the first-order term coefficient of the temperature coefficient of resistance, and $\beta$ is the second-order term coefficient of the temperature coefficient of resistance, the value of the first-order term coefficient, $\alpha$, of the temperature coefficient of resistance is at least 3,650 ppm/°C. A deviation in the temperature coefficient of resistance can be effectively reduced or eliminated, making circuit regulation easier.

16 Claims, 6 Drawing Sheets

RESISTORS FOR THERMAL FLOWMETERS

BACKGROUND OF THE INVENTION

The present invention relates generally to a resistor for a thermal flowmeter, and more specifically to a resistor for a thermal flowmeter adapted to measure an air intake in internal combustion engines.

So far, a thermal air flowmeter has been known as a device for measuring the flow rate of air in an automotive internal combustion engine. According to this flowmeter, a heat generator is located in an air intake passage and maintained at a certain temperature, e.g., 100° C., by current control to measure a change in the quantity of heat needed to cool the heat generator in the form of a resistance value change.

Figure 1:
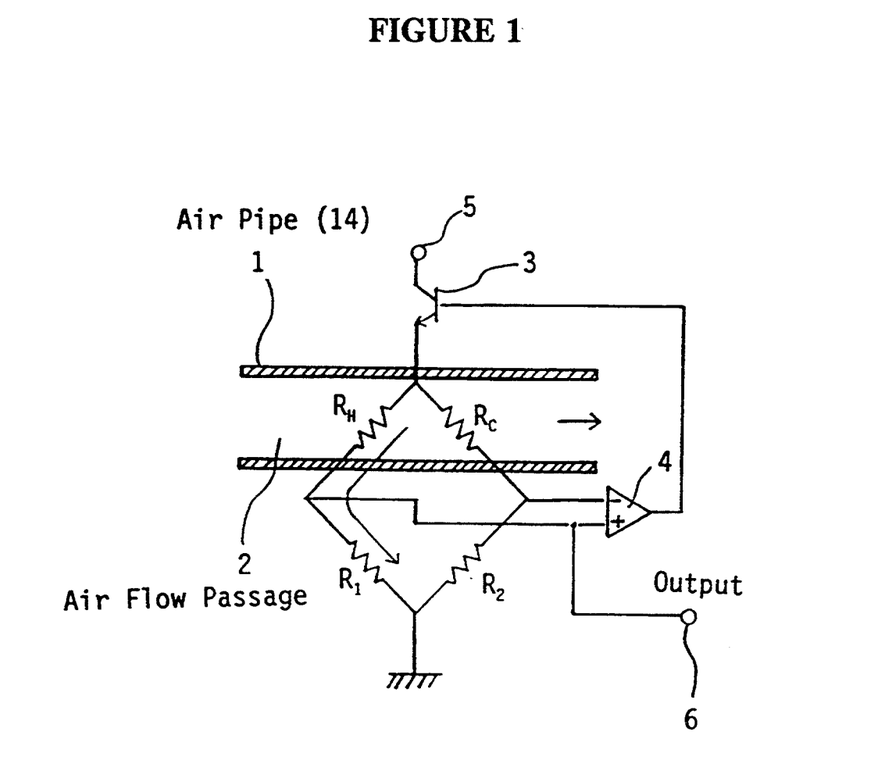
FIG. 1 is a circuit diagram showing the electric circuit in the resistor for a thermal flowmeter according to one embodiment of the invention.

Such a thermal flowmeter includes an electric circuit such as one shown in FIG. 1. As illustrated, a heat-generation resistor RH and a temperature-compensation resistor $R_C$ are located in an air pipe 1 for contact with an air flow through it, and resistors $R_1$ and $R_2$, located on the outside of an air flow passage 2, are connected thereto in the form of a bridge circuit. Here, the heat-generation resistor $R_H$ is a resistor for flow rate measurement while the temperature-compensation resistor $R_C$ is a resistor that is maintained at the same temperature as that of air in the air flow passage 2. For $R_H$ and $R_C$, resistors having resistance values of about 10–30Ω and about 150–1,000Ω are used, respectively. In FIG. 1, reference numeral 3 stands for a transistor, 4 a comparator and 5 a terminal to which the voltage for driving the electric circuit is applied. The bridge circuit is balanced so as to make the temperature of the resistor $R_H$ higher than that of air (i.e., the temperature of the resistor $R_C$), whereby a heating current is supplied to the bridge to keep the temperature of the resistor $R_H$ constant. Then, the voltages at both ends of $R_1$ can produce an output 6 that corresponds to the flow rate of air.

A typical example of the resistor for a thermal flowmeter, mentioned above as is referred to in JP-A-61-40513 which discloses a cylindrical thin film form of platinum resistor having a temperature coefficient of resistance of 3,500 ppm/°C. with a deviation of ±3% (=±105 ppm/°C.).

However, this thin film form of platinum resistor has (1) a temperature coefficient of resistance of 3,500 ppm/°C. and (2) a temperature-coefficinet-of-resistance deviation as large as ±105 ppm/°C.

If there is a large deviation in the temperature coefficient of resistance of such a thin film form of platinum resistor, there is then a flow rate measurement error depending on the temperature of a fluid. In order to make temperature compensation depending on this deviation in the temperature coefficient of resistance, therefore, it is required to regulate an electric circuit. Explaining this with reference to the above-mentioned conventional thin film form of platinum resistor having a deviation of ±100 ppm/°C. in the temperature coefficient of resistance, there is a fluctuation of at most ±8% in the output of each flowmeter depending on the temperature of fluid is at (e.g., 20° C. and 80° C.), even when the electric circuit is pre-adjusted so as to permit the flowmeter to produce a constant output at normal temperatures (e.g., 20° C.). The compensation of this requires troublesome circuit regulation, because the electric circuit must be regulated for temperature compensations at the two temperatures, i.e., normal and high temperatures (e.g., 20° C. and 80° C.).

The large deviation in the temperature coefficient of resistance of the above-mentioned conventional resistor is caused by the fact that the platinum thin film is not uniformly formed on a cylindrical ceramic member, resulting in a local drop of its temperature coefficient of resistance.

An object of the invention is therefore to provide a resistor for a thermal flowmeter, which enables the above-mentioned deviation in the temperature coefficient of resistance to be effectively reduced or eliminated, thus making circuit regulation operation easier.

SUMMARY OF THE INVENTION

According to the invention, the object mentioned above is achieved by the provision of a resistor for a thermal flowmeter which includes a ceramic substrate, a thin platinum film formed on the surface of the ceramic substrate, and lead wires for connecting the thin platinum film with an external circuit, and is located in a fluid to detect its flow rate, wherein:

when the resistance value, R (Ω), of said resistor for a thermal flowmeter is expressed in terms of a function of temperature, T (°C.):

$$R = R_0 (1 + \alpha T + \beta T^2)$$

where $R_0$ is the resistance value in Ω of the resistor for a thermal flowmeter at 0° C., $\alpha$ is the first-order term coefficient of the temperature coefficient of resistance, and $\beta$ is the second-order term coefficient of the temperature coefficient of resistance, the value of the first-order term coefficient, $\alpha$, of the temperature coefficient of resistance is at least 3,650 ppm/°C.

Preferably, the first- and second-order term coefficients mentioned above are calculated within a temperature range of −30°C. to +180° C.

Preferably, the ceramic substrate mentioned above is in a cylindrical form.

Preferably, the thin platinum film mentioned above is formed by sputtering at a thin film forming rate up to 100 Å/min.

Preferably, the thin platinum film mentioned above is thermally treated at 700° C. or higher after the sputtering.

Preferably, the thin platinum film mentioned above is 0.2 to 1.5 μm in thickness.

BRIEF DESCRIPTION OF THE DRAWINGS

The features of the invention which are believed to be novel are particularly pointed out and distinctly claimed in the concluding portion of this specification. However, the invention both as to its construction and operation together with further objects and advantages thereof may be best appreciated by reference to the following detailed description taken in conjunction with the drawings, in which:

DETAILED EXPLANATION OF THE PREFERRED EMBODIMENTS

Referring now to FIG. 1, there is shown one example of the electric circuit built in a resistor element for a thermal type of flowmeter according to the invention that is applied as an air flow sensor in an internal combustion engine. A heat-generation resistor $R_H$ and a temperature-compensation resistor $R_C$, that are parts of the bridge forming this electric circuit, are each formed as a thin film resistor structure, as shown in FIG. 2.

Figure 2:
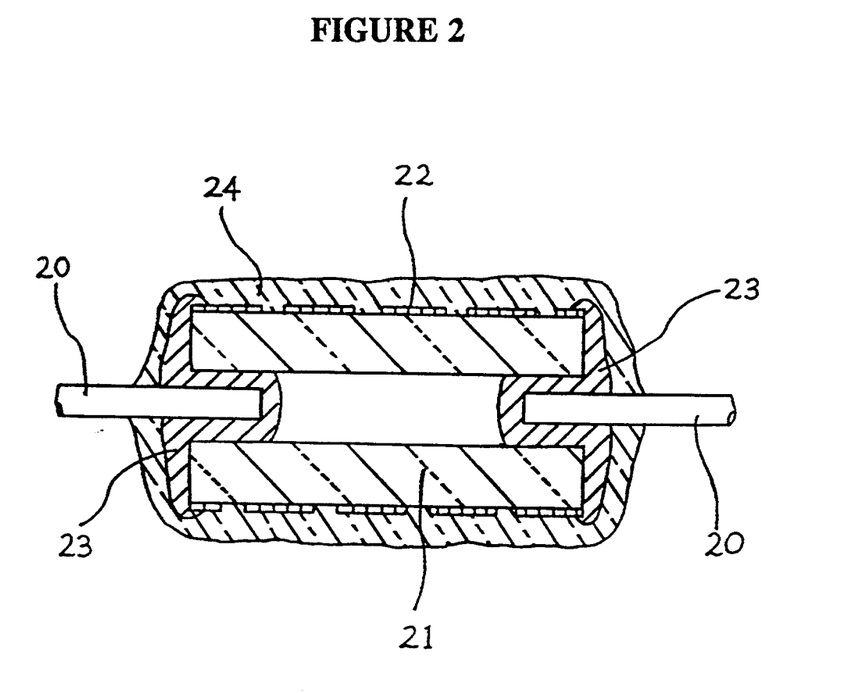
FIG. 2 is a generally sectioned view of the thermal flowmeter embodying the invention.

As cam be seen from FIG. 2, a thin platinum film 22 is provided on the outer surface of a ceramic pipe 21 made of alumina porcelain. In view of productivity, the thin platinum film 22 is preferably formed by barrel sputtering. Then, the thin film 22 is thermally treated at a given temperature, e.g., 900° C., and further trimmed spirally by laser trimming, thereby imparting a given resistance value thereto. At both ends of the ceramic pipe 21, the thin platinum film 22 is connected to lead wires 20 and 20, each made of a platinum wire, through an electrically conductive connecting paste 23 obtained by mixing glass or the like with a conductor such as platinum. The ceramic pipe 21 (thin platinum film 22) is covered with an insulating protective film 24 that is made of glass or the like has a given thickness.

The heat-generation and temperature-compensation resistors $R_H$ and $R_C$ are regulated to the respective resistance values of 10–30Ω and 400–1,000Ω by varying the pitch of the spiral.

In Examples 1–4, resistors with the target values of the first-order term coefficient, $\alpha$, of the temperature coefficient of resistance lying in the range of 3,400 ppm/°C. to 3,840 ppm/°C. were experimentally fabricated by varying the sputtering rate (for film formation). Each of the obtained resistors was incorporated in a flowmeter to examine its output.

By definition, the first-order term coefficient, $\alpha$, of the temperature coefficient of resistance is calculated by the least squares method from $$R = R_0(1 + \alpha T + \beta T^2)$$

where $R_0$ is the resistance value at 0° C. To this end, the resistance value of each resistor was measured at eight temperatures, say −30° C., 0° C., 30°C., 60° C., 90° C., 120° C., 150° C., and 180°C., chosen from the range of −30°C. to +180°C.

Here, it is as a matter of course that the first-order term coefficient, $\alpha$, of the temperature coefficient of resistance varies in a different temperature range.

EXAMPLE 1

Prepared at varying barrel sputtering rates in this example were six 0.6-μm-thick thin film resistors with the first-order term coefficients, $\alpha$, of the temperature coefficient of resistance being targeted to (A) 3,840 ppm/°C., (B) 3,820 ppm/°C., (C) 3,800 ppm/°C., (D) 3,700 ppm/°C., (E) 3,600 ppm/°C., and (F) 3,500 ppm/°C.

It is noted that the heat treatment after sputtering was done at 900° C. for 30 minutes.

TABLE 1

Example 1, Film Thickness: 0.6 μm
Heat Treatment after Sputtering: 900° C. × 30 min.

| Target Temperature Coefficient of Resistance (First-Order Term Coefficient $\alpha$) | Sputtering Conditions | | $\alpha$ of Temperature Coefficient of Resistance (ppm/°C.) | | | | |
|---|---|---|---|---|---|---|---|
| | Sputtering Rate (Å/min) | Sputtering Time (min) | n | Average | Max. | Min. | Deviation Max–Min |
| A 3840 ppm/°C. | 15 | 400 | 100 | 3837 | 3850 | 3823 | ±13.5 (27) |
| B 3820 ppm/°C. | 30 | 200 | 100 | 3824 | 3841 | 3812 | ±14.5 (29) |
| C 3800 ppm/°C. | 50 | 120 | 100 | 3795 | 3809 | 3781 | ±14 (28) |
| D 3700 ppm/°C. | 100 | 60 | 100 | 3694 | 3726 | 3658 | ±34 (68) |
| E 3600 ppm/°C. | 200 | 30 | 100 | 3590 | 3648 | 3527 | ±60.5 (121) |
| F 3500 ppm/°C. | 300 | 20 | 100 | 3504 | 3595 | 3409 | ±93 (186) |

Figure 3:
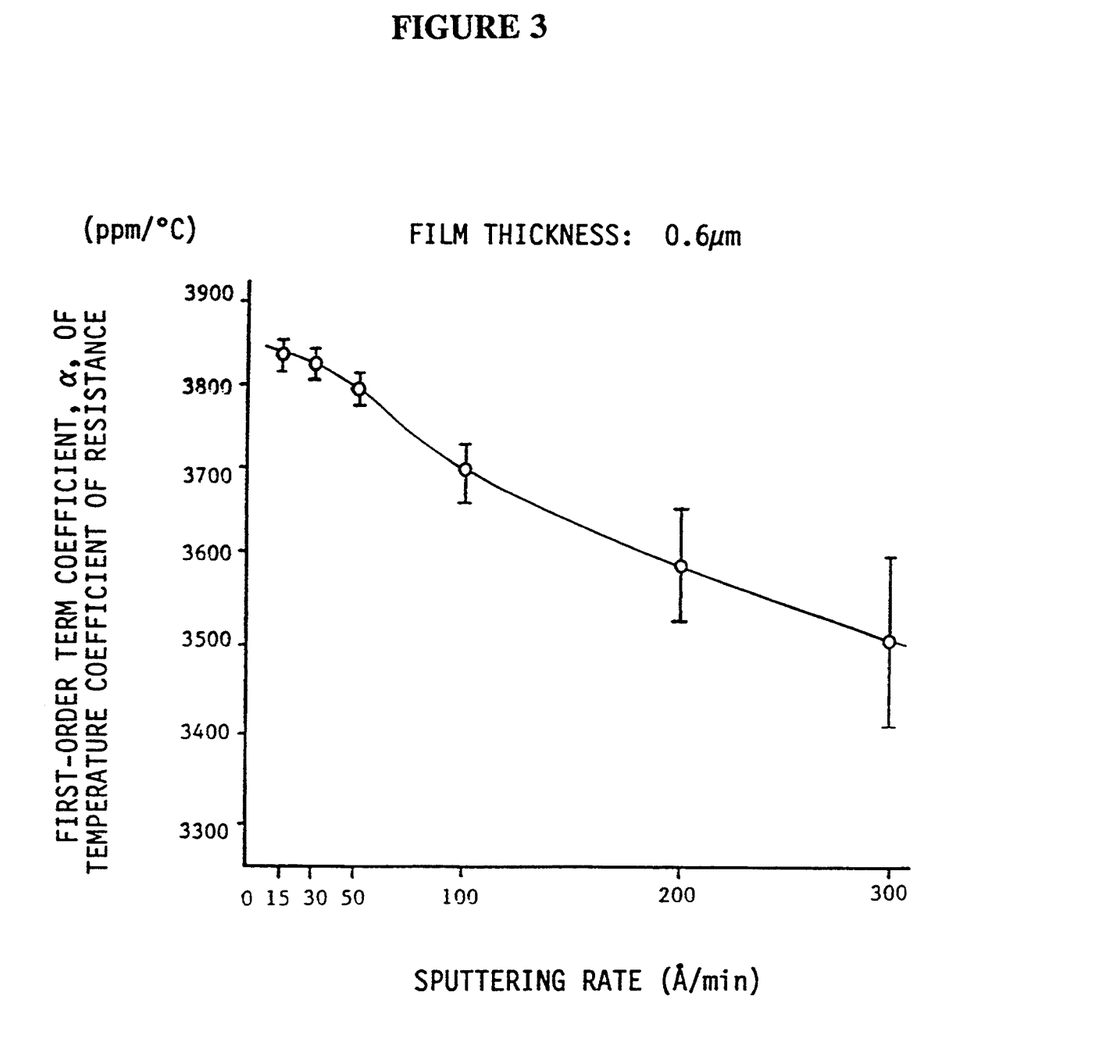
FIG. 3 is a characteristic diagram showing the relation between the sputtering rate and the temperature coefficient of resistance in Example 1 of the invention.

Represented in FIG. 3 is the relation between the sputtering rates and the first-order term coefficients, $\alpha$, of the temperature coefficient of resistance, which reveals that the slower the sputtering rate, the smaller the deviation in the first-order term coefficient of the temperature coefficient of resistance.

Then, each of the resistor samples (A)–(F) having the above-mentioned first-order term coefficients was built in an electric circuit for a thermal flowmeter. Circuit regulation was done at 20° C. to keep the flowmeter output constant at that temperature.

Then, the fluids were brought up to the temperature of 80° C. to make investigations on how the flowmeters using the resistor samples (A)–(F) changed in terms of output as compared with those at 20° C.

The results are shown in Table 2.

TABLE 2

| Target Temperature Coefficient of Resistance (First-Order Term Coefficient, $\alpha$) | n | Flowmeter Output Fluctuation due to Fluid Temperature Fluctuation (20° C. → 80° C.) |
|---|---|---|
| A 3840 ppm/°C. | 50 | ±1.1% |
| B 3820 ppm/°C. | 50 | ±1.2% |
| C 3800 ppm/°C. | 50 | ±1.2% |
| D 3700 ppm/°C. | 50 | ±2.6% |
| E 3600 ppm/°C. | 50 | ±4.8% |
| F 3500 ppm/°C. | 50 | ±7.9% |

EXAMPLE 2

Prepared as varying barrel sputtering rates in this example were five 1.2-μm-thick thin film resistors with the first-order term coefficients, $\alpha$, of the temperature coefficient of resistance being targeted to (G) 3,820 ppm/°C., (H) 3,800 ppm/°C., (I) 3,700 ppm/°C., (J) 3,600 ppm/°C., and (K) 3,500 ppm/°C.

It is noted that the heat treatment after sputtering was done at 900° C. for 30 minutes.

TABLE 3

Example 2, Film Thickness: 1.2 μm
Heat Treatment after Sputtering: 900° C. × 30 min.

| Target Temperature Coefficient of Resistance (First-Order Term Coefficient α) | Sputtering Conditions | | α of Temperature Coefficient of Resistance (ppm/°C.) | | | | |
|---|---|---|---|---|---|---|---|
| | Sputtering Rate (Å/min) | Sputtering Time (min) | n | Average | Max. | Min. | Deviation Max–Min |
| G 3820 ppm/°C. | 30 | 400 | 100 | 3829 | 3841 | 3817 | ±14 (28) |
| H 3800 ppm/°C. | 50 | 240 | 100 | 3810 | 3825 | 3794 | ±15.5 (31) |
| I 3700 ppm/°C. | 100 | 120 | 100 | 3706 | 3735 | 3677 | ±29 (58) |
| J 3600 ppm/°C. | 200 | 60 | 100 | 3602 | 3647 | 3560 | ±43.5 (87) |
| K 3500 ppm/°C. | 300 | 40 | 100 | 3536 | 3626 | 3435 | ±95.5 (191) |

Figure 4:
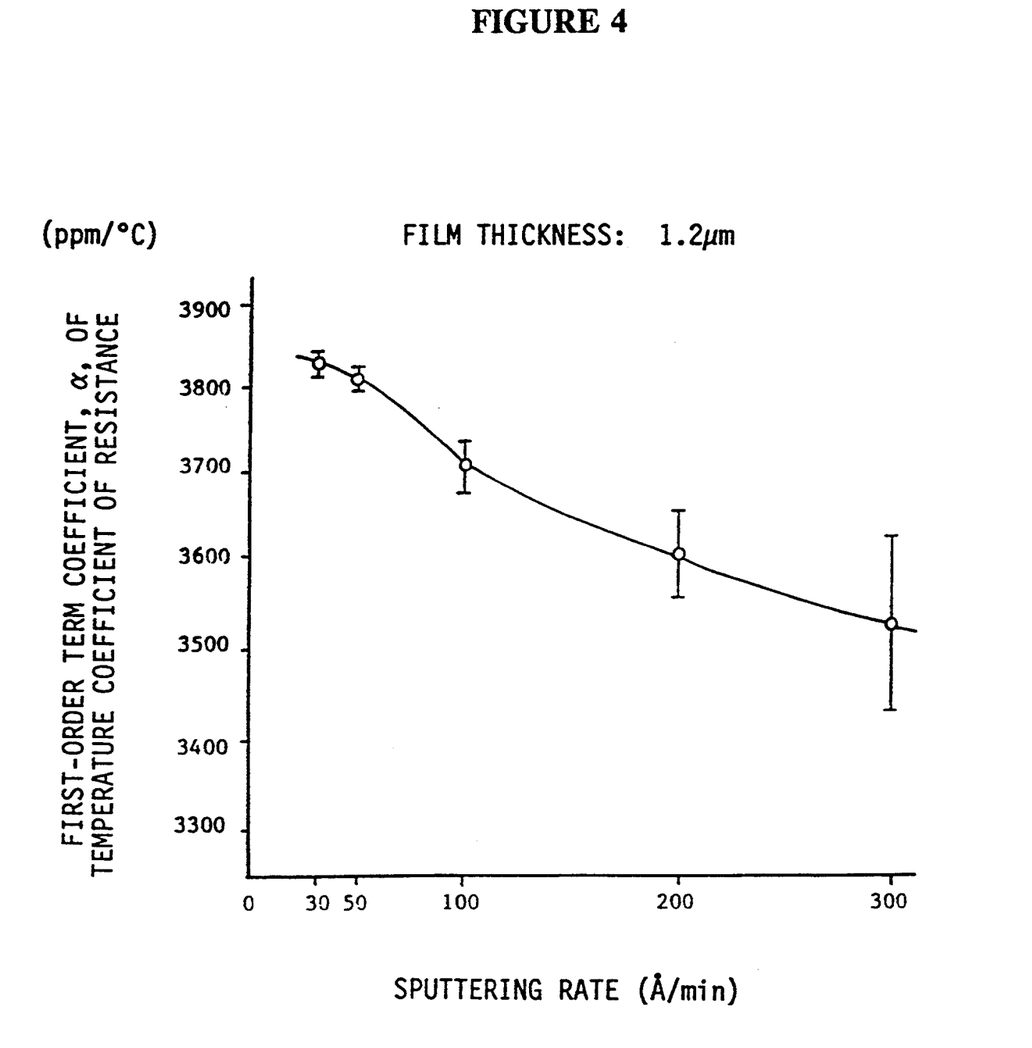
FIG. 4 is a characteristic diagram showing the relation between the sputtering rate and the temperature coefficient of resistance in Example 2 of the invention.

Represented in FIG. 4 is the relation between the sputtering rates and the first-order term coefficients, α, of the temperature coefficient of resistance, which reveals that the slower the sputtering rate, the smaller the deviation in the first-order term coefficient of the temperature coefficient of resistance.

At the same sputtering rate, the values of the first-order term coefficient, α, of these samples are slightly larger than those of Samples (A)–(F) of Example 1, because the platinum film thickness in Samples (G)–(K) is larger than that in Samples (A)–(F).

Then, each of the resistor samples (G)–(K) having the above-mentioned first-order term coefficients was built in an electric circuit for a thermal flowmeter. Circuit regulation was done at 20° C. to keep the flowmeter output constant at that temperature.

Then, the fluids were brought up to the temperature of 80° C. to make investigations on how the flowmeters using the resistor samples (G)–(K) changed in terms of output as compared with those at 20° C.

The results are shown in Table 4.

TABLE 4

| Target Temperature Coefficient of Resistance (First-Order Term Coefficient, α) | n | Flowmeter Output Fluctuation due to Fluid Temperature Fluctuation (20° C. → 80°C.) |
|---|---|---|
| G 3820 ppm/°C. | 50 | ±1.1% |
| H 3800 ppm/°C. | 50 | ±1.2% |
| I 3700 ppm/°C. | 50 | ±2.4% |
| J 3600 ppm/°C. | 50 | ±3.6% |
| K 3500 ppm/°C. | 50 | ±7.6% |

EXAMPLE 3

Prepared at varying barrel sputtering rates in this example were seven 0.2-μm-thick thin film resistors with the first-order term coefficients, α, of the temperature coefficient of resistance being targeted to (L) 3,820 ppm/°C., (M) 3,800 ppm/°C., (N) 3,750 ppm/°C., (O) 3,700 ppm/°C., (P) 3,680 ppm/°C., (Q) 3,550 ppm/°C., and (R) 3,400 ppm/°C.

It is noted that the heat treatment after sputtering was done at 900° C. for 30 minutes.

TABLE 5

Example 3, Film Thickness: 0.2 μm
Heat Treatment after Sputtering: 900°C. × 30 min.

| Target Temperature Coefficient of Resistance (First-Order Term Coefficient α) | Sputtering Conditions | | α of Temperature Coefficient of Resistance (ppm/°C.) | | | | |
|---|---|---|---|---|---|---|---|
| | Sputtering Rate (Å/min) | Sputtering Time (min) | n | Average | Max. | Min. | Deviation Max–Min |
| L 3820 ppm/°C. | 15 | 133 | 100 | 3808 | 3725 | 3795 | ±15 (30) |
| M 3800 ppm/°C. | 30 | 67 | 100 | 3796 | 3810 | 3778 | ±16 (32) |
| N 3750 ppm/°C. | 50 | 40 | 100 | 3771 | 3785 | 3752 | ±16.5 (33) |
| O 3700 ppm/°C. | 80 | 25 | 100 | 3702 | 3731 | 3667 | ±32 (64) |
| P 3680 ppm/°C. | 100 | 20 | 100 | 3684 | 3721 | 3655 | ±33 (66) |
| Q 3550 ppm/°C. | 200 | 10 | 100 | 3536 | 3601 | 3460 | 70.5 (141) |
| R 3400 ppm/°C. | 300 | 6.7 | 100 | 3409 | 3520 | 3282 | ±119 (238) |

Figure 5:
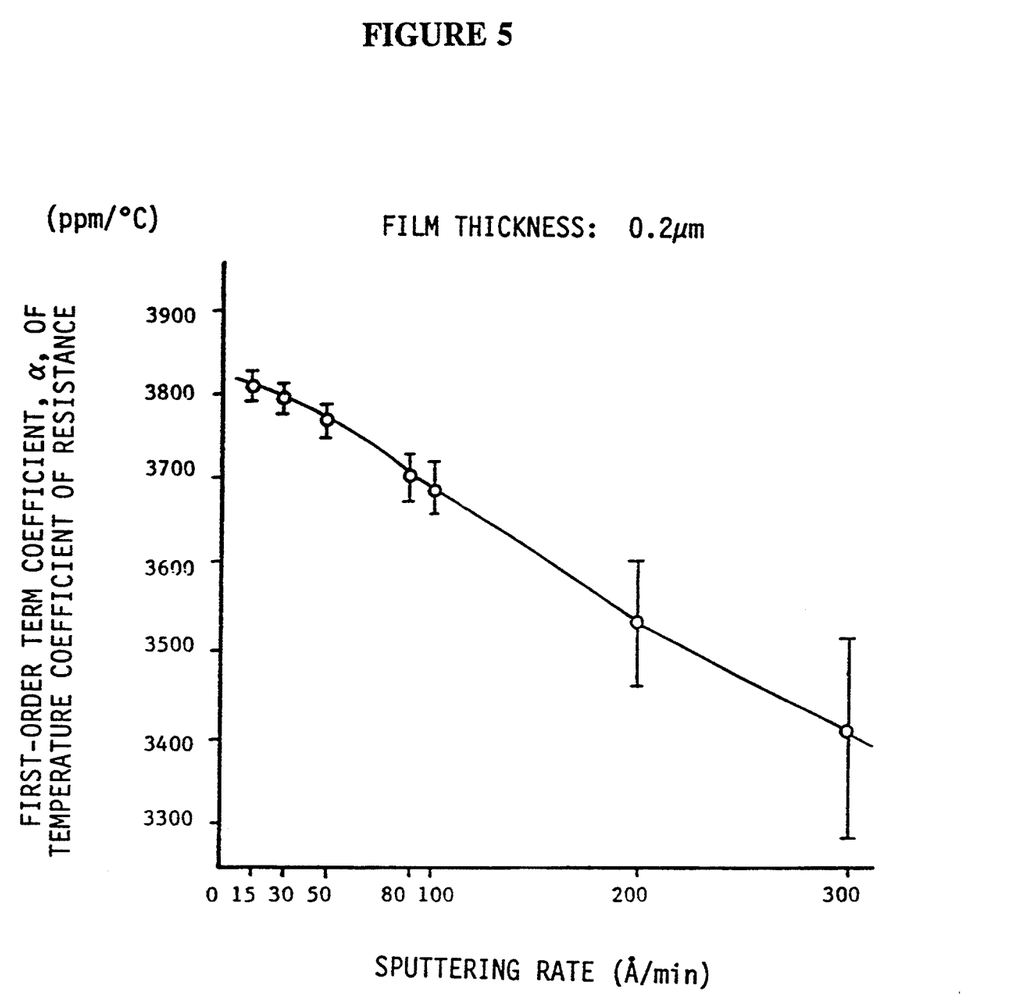
FIG. 5 is a characteristic diagram showing the relation between the sputtering rate and the temperature coefficient of resistance in Example 3 of the invention.

Represented in FIG. 5 is the relation between the sputtering rates and the first-order term coefficients, α, of the temperature coefficient of resistance, which reveals that the slower the sputtering rate, the smaller the deviation in the first-order term coefficient of the temperature coefficient of resistance is.

At the same sputtering rate, the values of the first-order term coefficients, α, of these samples are slightly smaller than those of Samples (A)–(F), because the platinum film thickness in Samples (L)–(R) is smaller than that in Samples (A)–(F).

Then, each of the resistor samples (L)–(R) having the above-mentioned first-order term coefficients was built in an electric circuit for a thermal flowmeter. Circuit regulation was done at 20° C. to keep the flowmeter output constant at that temperature.

Then, the fluids were brought up to the temperature of 80° C. to make investigations on how the flowmeters using the resistor samples (L)–(R) changed in terms of output as compared with those at 20° C.

The results are shown in Table 6.

TABLE 6

| Target Temperature Coefficient of Resistance (First-Order Term Coefficient, α) | n | Flowmeter Output Fluctuation due to Fluid Temperature Fluctuation (20°C. → 80° C.) |
|---|---|---|
| L 3820 ppm/°C. | 50 | ±1.2% |

TABLE 6-continued

| Target Temperature Coefficient of Resistance (First-Order Term Coefficient, α) | n | Flowmeter Output Fluctuation due to Fluid Temperature Fluctuation (20°C. → 80° C.) |
|---|---|---|
| M 3800 ppm/°C. | 50 | ±1.3% |
| N 3750 ppm/°C. | 50 | ±1.2% |
| O 3700 ppm/°C. | 50 | ±2.7% |
| P 3680 ppm/°C. | 50 | ±2.8% |
| Q 3550 ppm/°C. | 50 | ±5.4% |
| R 3400 ppm/°C. | 50 | ±10.1% |

EXAMPLE 4

Prepared at varying barrel sputtering rates in this example were seven 0.6-μm-thick thin film resistors with the first-order term coefficients, α, of the temperature coefficient of resistance being targeted to (S) 3,820 ppm/°C., (T) 3,800 ppm/°C., (U) 3,750 ppm/°C., (V) 3,700 ppm/°C., (W) 3,680 ppm/°C., (X) 3,550 ppm/°C., and (Y) 3,400 ppm/°C.

It is noted that the heat treatment after sputtering was done at 750° C. for 30 minutes.

TABLE 7

Example 4, Film Thickness: 0.6 μm
Heat Treatment after Sputtering: 750° C. × 30 min.

| Target Temperature Coefficient of Resistance (First-Order Term Coefficient α) | Sputtering Conditions | | α of Temperature Coefficient of Resistance (ppm/°C.) | | | | |
|---|---|---|---|---|---|---|---|
| | Rate (Å/min) | Sputtering Time (min) | n | Average | Max. | Min. | Deviation Max–Min |
| S 3820 ppm/°C. | 15 | 400 | 100 | 3807 | 3822 | 3790 | ±16 (32) |
| T 3800 ppm/°C. | 30 | 200 | 100 | 3793 | 3807 | 3777 | ±15 (30) |
| U 3750 ppm/°C. | 50 | 120 | 100 | 3757 | 3773 | 3743 | ±15 (30) |
| V 3700 ppm/°C. | 80 | 75 | 100 | 3703 | 3730 | 3672 | ±29 (58) |
| W 3680 ppm/°C. | 100 | 60 | 100 | 3685 | 3743 | 3653 | ±35 (70) |
| X 3550 ppm/°C. | 200 | 30 | 100 | 3562 | 3636 | 3480 | ±78 (156) |
| Y 3400 ppm/°C. | 300 | 20 | 100 | 3415 | 3555 | 3295 | ±130 (260) |

Figure 6:
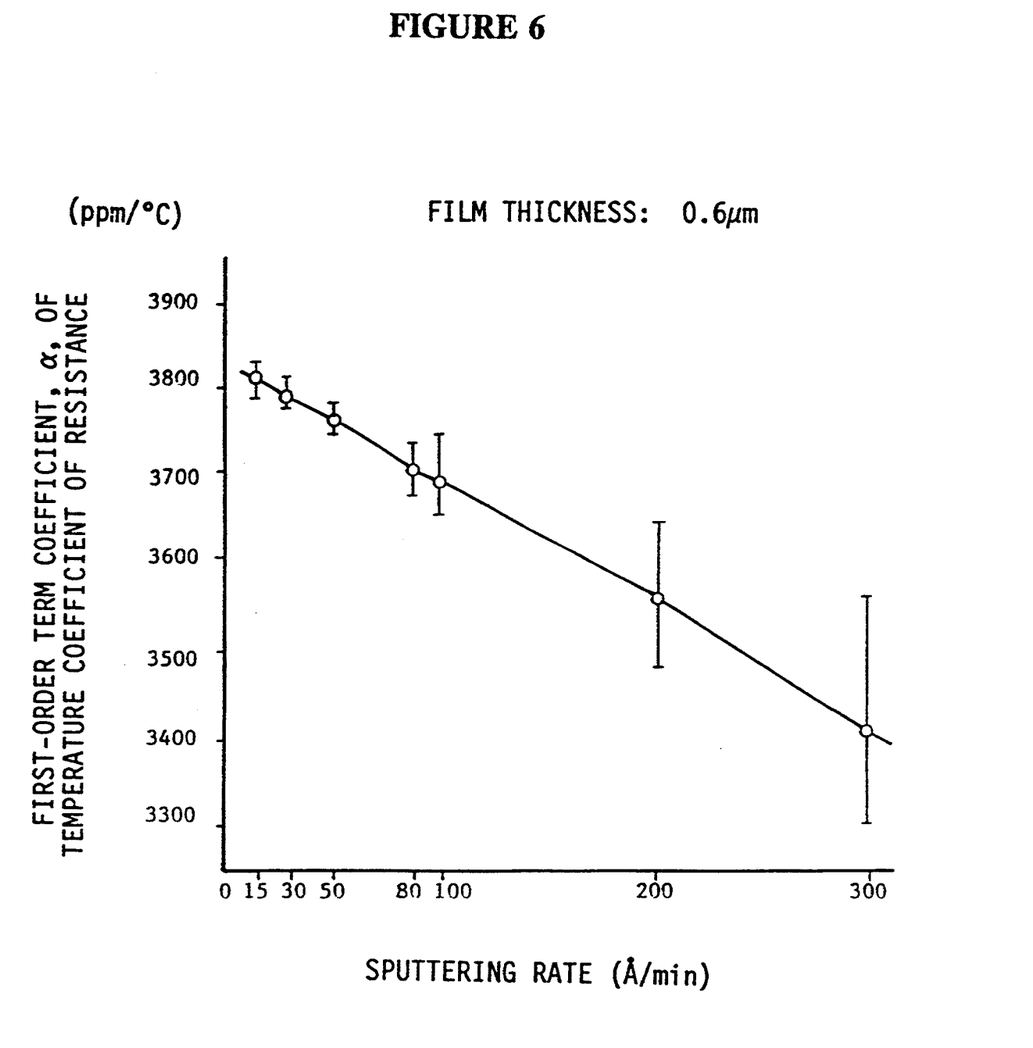
FIG. 6 is a characteristic diagram showing the relation between the sputtering rate and the temperature coefficient of resistance in Example 4 of the invention.

Represented in FIG. 6 is the relation between the sputtering rates and the first-order term coefficients, α, of the temperature coefficient of resistance, which reveals that the slower the sputtering rate, the smaller the deviation in the first-order term coefficient of the temperature coefficient of resistance is.

At the same sputtering rate, the values of the first-order term coefficients, α, of these samples are slightly smaller than those of Samples (A)–(F) of Example 1, because the heat-treatment temperature in Samples (S)–(Y) is lower than that in Samples (A)–(F).

Then, each of the resistor samples (S)–(Y) having the above-mentioned first-order term coefficients was built in an electric circuit for a thermal flowmeter. Circuit regulation was done at 20° C. to keep the flowmeter output constant at that temperature.

Then, the fluids were brought up to the temperature of 80° C. to make investigations on how the flowmeters using the resistor samples (S)–(Y) changed in terms of output as compared with those at 20° C.

The results are shown in Table 8.

TABLE 8

| Target Temperature Coefficient of Resistance (First-Order Term Coefficient, α) | n | Flowmeter Output Fluctuation due to Fluid Temperature Fluctuation (20° C. → 80° C.) |
|---|---|---|
| S 3820 ppm/°C. | 50 | ±1.2% |
| T 3800 ppm/°C. | 50 | ±1.1% |
| U 3750 ppm/°C. | 50 | ±1.3% |
| V 3700 ppm/°C. | 50 | ±2.4% |

TABLE 8-continued

| Target Temperature Coefficient of Resistance (First-Order Term Coefficient, α) | n | Flowmeter Output Fluctuation due to Fluid Temperature Fluctuation (20° C. → 80° C.) |
|---|---|---|
| W 3680 ppm/°C. | 50 | ±2.8% |
| X 3550 ppm/°C. | 50 | ±6.0% |
| Y 3400 ppm/°C. | 50 | ±10.9% |

From a comparison between Examples 1, 2 and 3, it is found as follows. Although the values of the first-order term coefficients of the temperature coefficient of resistance vary slightly with the platinum film thickness, when sputtered at the same sputtering rate, they are almost nearly determined by the sputtering rate and vary largely at varying sputtering rates. In other words, those values are almost nearly independent of film thickness.

From a comparison between Examples 1 and 4, it is again found as follows. Although the values of the first-order term coefficients of the temperature coefficient of resistance vary slightly with the heat treatment conditions after sputtering, when sputtered at the same sputtering rate, they are almost nearly determined by the sputtering rate and vary largely at varying sputtering rates. In other words, those values are almost nearly independent of the thermal treatment conditions.

In Examples 1–4, the heat treatments were done at 750° C. and 900° C. It is understood, however, that even when heat treatments were done at 950° C. for 30 minutes and 1,000° C. for 30 minutes, the results were almost similar to those obtained at 900° C. for 30 minutes (in Example 1).

Also, even when the heat treatment was done at lower than 750° C., e.g., 700° C. for 30 minutes, the results were almost similar to those obtained at 750° C. for 30 minutes (in Example 4).

Throughout Examples 1–4, it is further noted that the first-order term coefficients, α, of the temperature coefficient of resistance before the heat treatment were on the order of 1,000 to 1,500 ppm/°C. with a deviation of ±300 ppm/°C., and made no difference depending on the sputtering rate. This suggests that the first-order term coefficients of the temperature coefficient of resistance and their deviation are primarily determined by the sputtering rate, in case of the heat treatment.

As can be understood from Examples 1–4, when resistors with the values of the first-order term coefficients, α, of the temperature coefficient of resistance being 3,650 ppm/°C. or more, more illustratively, Samples (A)–(D), (G)–(I), (L)–(P), (S)–(V) and (W) that are sputtered with thin platinum films at a sputtering rate up to 100 Å/min, are used with thermal flowmeters, their output fluctuation due to a fluid temperature fluctuation (20° C.→80° C.) is limited to within ±3%.

A comparison between Examples 1, 2 and 3 teaches that, when sputtering takes place at a rate up to 100 Å /min and at a film thickness of 0.2 μm to 1.2 μm, the above-mentioned output fluctuation is almost nearly independent of film thickness. A comparison of Example 1 with 4 also teaches that the above-mentioned output fluctuation is almost nearly independent of the post-sputtering heat treatment temperature, insofar as the sputtering rate lies at 100 Å/min or below.

More preferably, resistors with the values of the first-order term coefficient, α, of the temperature coefficient of resistance being at least 3,750 ppm/°C. are built in thermal flowmeters. With Samples (A)-(C), (G)-(H), (L)-(N), (S)-(T) and (U) sputtered with thin platinum films at a sputtering rate up to 50 Å/min, for instance, the output fluctuation due to a fluid temperature fluctuation (20° C.→80° C.) is limited to with a smaller range of ±1.5%.

The accuracy required to measure an air intake in generally available combustion engines is ±3%, and the accuracy needed for more precise internal combustion engine control is preferably ±1.5%. According to the invention, therefore, it is possible to dispense with any electric circuit regulation at high temperatures so as to compensate for an output fluctuation due to a fluid temperature fluctuation.

It is preferable that the thin platinum films have a thickness in the range of 0.2 to 1.5 μm for the following reasons.

At a film thickness less than 0.2 μμm, the resistance value of a thin film itself becomes too high after the heat treatment after sputtering. This makes it difficult to trim the resistor element at the next step to obtain a heat-generation resistor having a resistance value of 10 to 30Ω.

At a film thickness more than 1.5 μm, longer sputtering time is needed, but this is not practical in view of resistor production. In order to obtain a temperature-compensation resistor having a resistance value of 150 to 1,000Ω, a resistor element having a thin platinum film of more than 1.5 mm in thickness must be laser-trimmed at a trimming pitch of about 40 μm or less, but this makes resistor production difficult.

If further consideration is taken into resistor yields after laser trimming, it is more preferable to use a thin film of 0.4 μm to 1.2 mm in thickness.

As can be understood from Tables 2, 4 and 6, the use of a resistor with the value of the first-order term coefficient, α, of the temperature coefficient of resistance being 3,650 ppm/°C. or more makes it possible to limit an output fluctuation of a flowmeter due to a fluid temperature fluctuation to within ±3%, thus dispensing with electric circuit regulation at high temperatures.

According to the invention, it is possible to fabricate a resistor product having a thin platinum film, with a given or more temperature dependent coefficient of resistance. The application of this resistor product to a thermal type of flowmeter makes it simple to regulate the electric circuit so as to make temperature compensation at the time of flow rate measurement, because it has a uniform temperature coefficient of resistance. For instance, temperature compensation can be achieved only by circuit regulation at normal temperature, making regulation operation much simpler.

Since certain changes may be made in the above construction without departing from the spirit and scope of the invention, it is intended that all matter contained in the above description or shown in the accompanying drawings shall be interpreted and not in a limiting sense.

We claim:

1. A resistor for a thermal flowmeter which includes a ceramic substrate, a thin platinum film formed on the surface of the ceramic substrate, and lead wires for connecting the thin platinum film with an external circuit, and is located in a fluid to detect its flow rate, wherein:

when the resistance value, R (Ω), of said resistor is expressed in terms of a function of temperature, T (°C.):

$$R = R_0 (1 + \alpha T + \beta T^2)$$

where $R_0$ is the resistance value in Ω of the resistor at 0° C., α is the first-order term coefficient of the temperature coefficient of resistance, and β is the second-order term coefficient of the temperature coefficient of resistance, the value of the first-order term coefficient, α, of the temperature coefficient of resistance is at least 3,650 ppm/°C.

2. A resistor according to claim 1, wherein the first and second-order term coefficients, α and β, are calculated within a temperature range of −30°C. to +180°C.

3. A resistor according to claim 1, wherein the ceramic substrate is form cylindrical.

4. A resistor according to claim 1, wherein the thin platinum film is formed by sputtering at a thin film forming rate up to 100 Å/min.

5. A resistor according to claim 1, wherein the thin platinum film is thermally treated at 700° C. or higher after the sputtering.

6. A resistor according to claim 1, wherein the thin platinum film is 0.2 to 1.5 μm in thickness.

7. A resistor according to claim 2, wherein the ceramic substrate is cylindrical.

8. A resistor according to claim 2, wherein the thin platinum film is formed by sputtering at a thin film forming rate up to 100 Å/min.

9. A resistor according to claim 3, wherein the thin platinum film is formed by sputtering at a thin film forming rate up to 100 Å/min.

10. A resistor according to claim 2, wherein the thin platinum film is thermally treated at 700° C. or higher after the sputtering.

11. A resistor according to claim 3, wherein the thin platinum film is thermally treated at 700° C. or higher after the sputtering.

12. A resistor according to claim 4, wherein the thin platinum film is thermally treated at 700° C. or higher after the sputtering.

13. A resistor according to claim 2, wherein the thin platinum film is 0.2 to 1.5 μm in thickness.

14. A resistor according to claim 3, wherein the thin platinum film is 0.2 to 1.5 μm in thickness.

15. A resistor according to claim 4, wherein the thin platinum film is 0.2 to 1.5 μm in thickness.

16. A resistor according to claim 5, wherein the thin platinum film is 0.2 to 1.5 μm in thickness.

* * * * *